Jan. 23, 1962 L. F. MATTI 3,017,992
MACHINE FOR CLASSIFYING PACKAGES ACCORDING TO WEIGHT
Filed March 24, 1958 8 Sheets-Sheet 1

INVENTOR
Leo F. Matti
by Carlson, Pitzner, Hubbard & Wolfe
ATTORNEYS

Jan. 23, 1962     L. F. MATTI     3,017,992

MACHINE FOR CLASSIFYING PACKAGES ACCORDING TO WEIGHT

Filed March 24, 1958                                    8 Sheets-Sheet 2

INVENTOR
Leo F. Matti
by Carlson, Pierce, Hubbard & Wolfe
ATTORNEY

Jan. 23, 1962  L. F. MATTI  3,017,992
MACHINE FOR CLASSIFYING PACKAGES ACCORDING TO WEIGHT
Filed March 24, 1958  8 Sheets-Sheet 4

INVENTOR
Leo F. Matti
by Carlson, Pitzner, Hubbard & Wolfe
ATTORNEY

United States Patent Office 3,017,992
Patented Jan. 23, 1962

3,017,992
MACHINE FOR CLASSIFYING PACKAGES
ACCORDING TO WEIGHT
Leo F. Matti, Rockford, Ill., assignor, by mesne assignments, to Bartelt Engineering Company, Inc., Rockford, Ill., a corporation of Delaware
Filed Mar. 24, 1958, Ser. No. 723,478
11 Claims. (Cl. 209—121)

This invention relates to a machine for receiving packages which have been filled by a dispensing device and for classifying the packages according to their weight. For example, the machine may separate the packages into groups, one group comprising packages which are within the range of correct weight, another group including underweight packages and a third group being those packages which are overweight.

The general object of the invention is to provide a new and improved machine of the above character which operates continuously and at a high speed and which accurately weighs and classifies the packages.

A more detailed object is to advance the packages across a weighing scale platform by means of a belt which is constructed and arranged in a novel manner so that it has a uniform affect on the scale platform and does not detract from the accuracy of the weighing of the packages.

Another object is to provide a novel circuit which produces a signal corresponding to the weight of each package rapidly and accurately and which initiates the proper classifying action.

The invention also resides in the novel mechanism for classifying the packages according to weight.

A further object is to provide a new and improved mechanism for utilizing the overweight and underweight signals to correct the operation of the dispensing device as soon as a trend of error is established so as to minimize the number of packages of incorrect weight discharged by the dispensing device.

Other objects and advantages of the invention will become apparent from the following detailed description taken in connection with the accompanying drawings, in which.

Figures 1, 2:
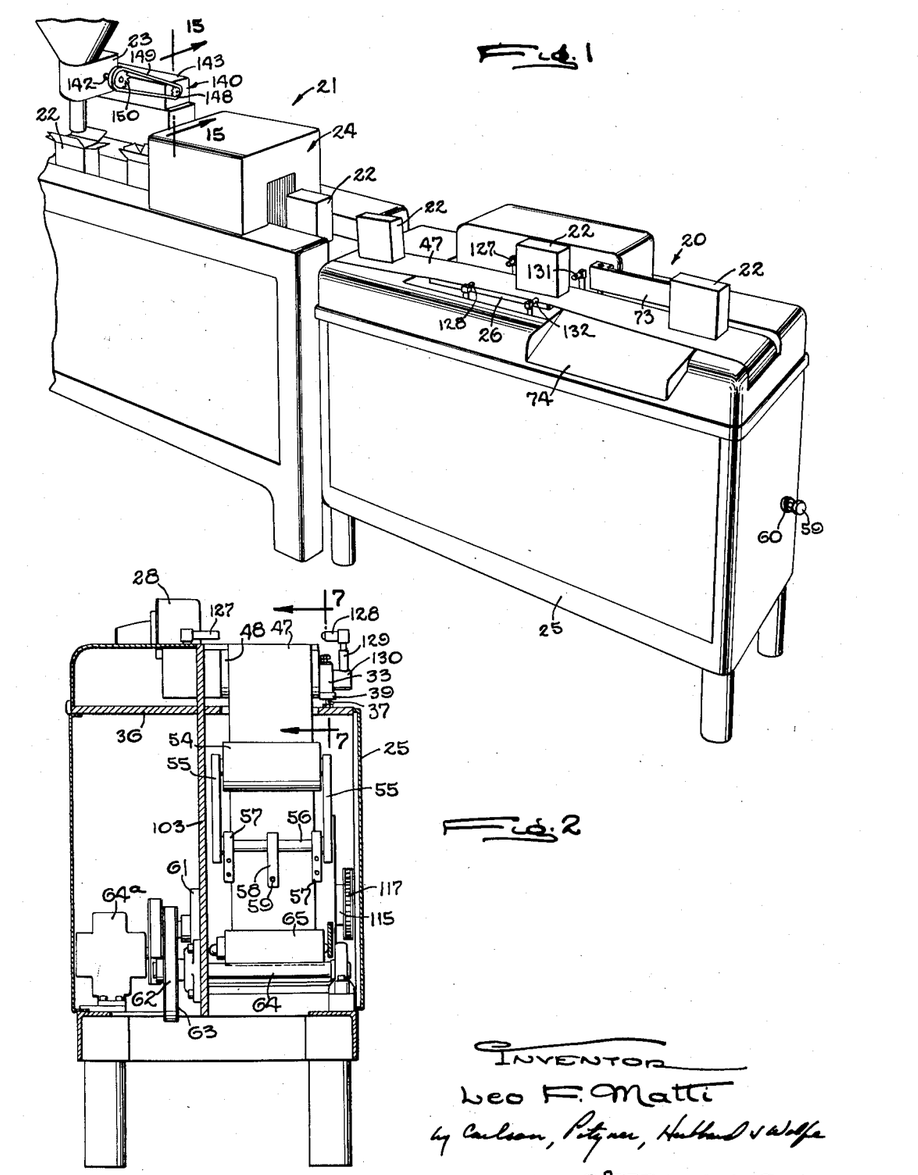
FIGURE 1 is a fragmentary perspective view of a packaging machine and a classifying machine constructed in accordance with the present invention.
FIG. 2 is a sectional view taken along the line 2—2 in FIG. 4.

As shown in the drawings for purposes of illustration, a weight classifier 20 constructed in accordance with the present invention is used in conjunction with a machine 21 for filling and closing cartons 22. On the machine 21, each carton is delivered to a position beneath a dispensing device or filler 23 with the upper end of the carton open as shown in FIG. 1. In this position, the filler deposits a predetermined measured quantity of material to be packaged in the carton which then is advanced to a station 24 where the top of the carton is closed. After the cartons have been filled and closed, they are transferred to the weight classifier 20 which automatically checks the weight of each carton to determine whether the weight is within an acceptable range or above or below this range and then classifies the cartons accordingly.

Figure 18:
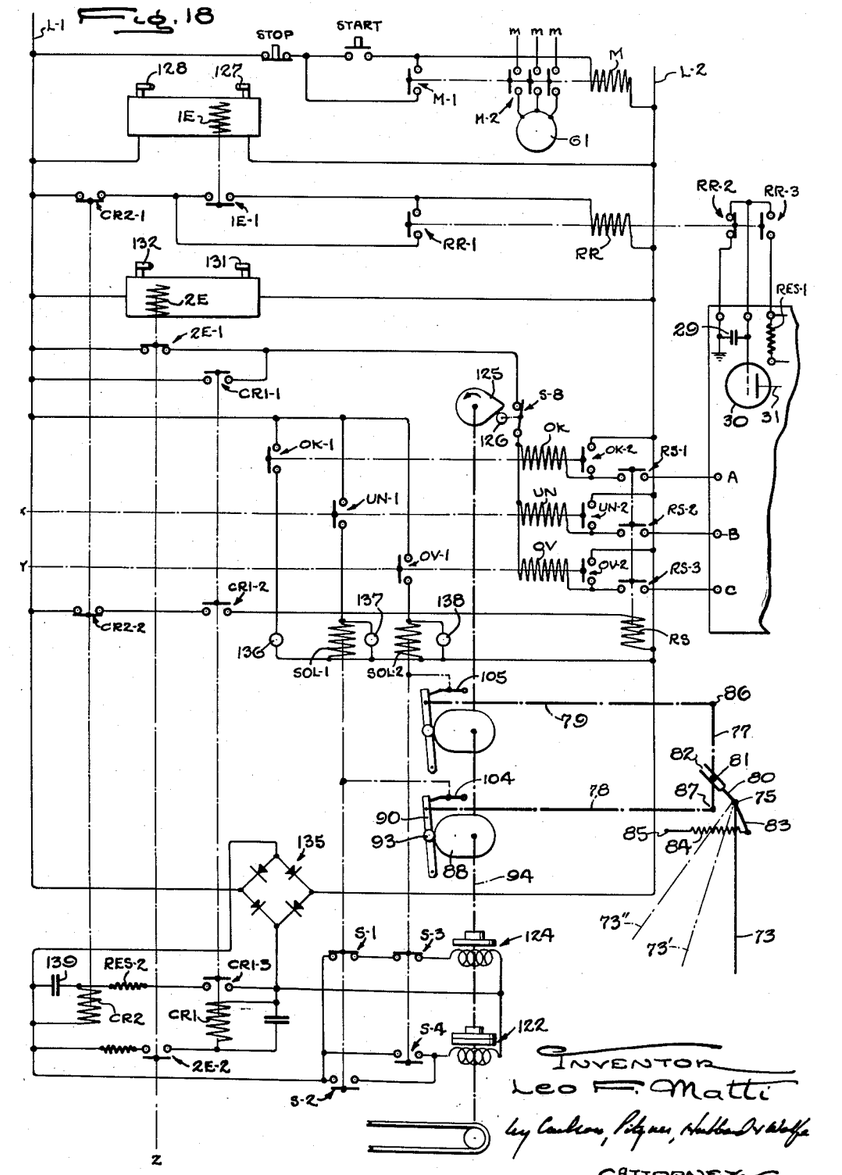
FIG. 18 is a schematic diagram of the circuit used to perform the classifying action of the machine.

The various operating parts of the weight classifier are enclosed within an elongated horizontal frame or housing 25 and include a scale platform 26 (FIG. 3) mounted on the end of a beam 27 which projects horizontally from a weighing head 28. The latter responds to the weight of a carton 22 on the platform 26 and then, as will be described in detail later, initiates the classification of the package according to its weight. Various types of well-known weighing heads can be used as long as they produce a signal corresponding to the weight of the package on the scale platform and the signal indicates whether the weight is within an acceptable range or above or below this range. A known head suitable for the purposes of this invention is illustratively shown in Patent No. 2,323,023. Herein, a head produces a signal responsive to the weight of the package across a resistor RES-1 (FIG. 18). When a relay RR is energized, contacts RR-3 of this relay are closed to charge a condenser 29, a shunt circuit for this condenser then being opened by the contacts RR-2 of the relay. The charge across the condenser is fed to the grid of a tube 30 which constitutes the input of a phase discriminating circuit 31 of well-known construction. If the carton being weighed is within the proper range, there will be a signal at the terminal A of the circuit. The signal will appear in the terminal B if the carton should be below this range and at the terminal C when the carton is overweight.

In order to support the head 28 within the housing 25, a flange 32 on the casing of the head is secured to a horizontal block 33 by bolts 34 (FIG. 3) and is located properly relative to the block by dowel pins 35. As shown in FIG. 4, the block 33 is supported by a horizontal plate 36 which is rigid with the frame 25 and the block is releasably connected to this plate so that the block, the head 28 and the scale platform 26 may be removed from the frame as a unit.

Figure 3:
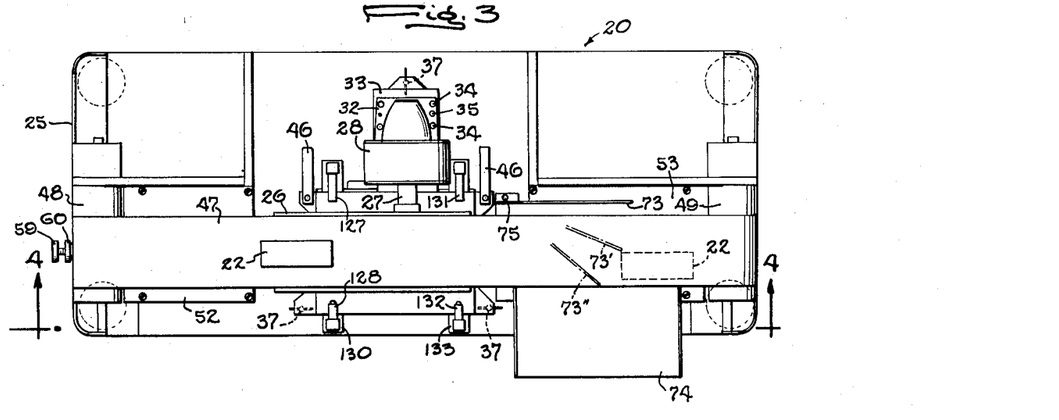
FIG. 3 is a plan view of the classifying machine.
Figure 4:
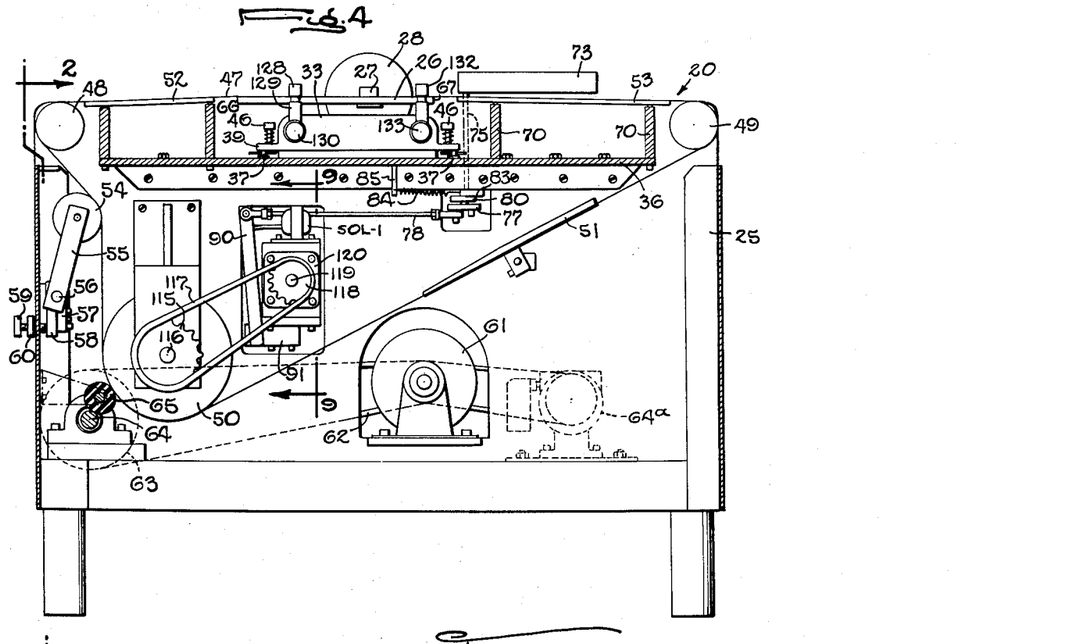
FIG. 4 is a sectional view taken along the line 4—4 in FIG. 3.

The block 33 is supported on the plate 36 through the medium of three screws 37, two of which engage the block near the front as shown in FIG. 3 while the third engages the back of the block. Each screw 37 is threaded into the plate 36 and its upper end is conical to project into a correspondingly shaped hole 38 formed in a flange 39 on the block 33. A pin 40 projects through the screw and serves as a finger piece for turning the screw so that the block may be leveled, the screw being held in the adjusted position by a lock nut 41. To hold the flange 39 down on the screws 37, bolts 42 extend through the flange and a pin 43 projects laterally from the lower end of each bolt. By turning the bolt, the pin 43 may be swung in under a bracket 44 (see FIG. 8) which is rigid with the plate 36. A compression spring 45 encircles each bolt 42 and acts between a handle 46 on the upper end of the bolt and the flange 39 so as to urge the pin 43 up against the underside of the bracket 44 and thereby press the flange 39 down on the screw 37. With this arrangement, the block is held firmly on the screws 37 by means of the springs 42 but may be released easily simply by grasping the handles 46 and depressing and turning the bolts 42 so as to free the pins 43 from the brackets 44.

The filled cartons 22 are delivered by the packaging machine 21 to the weight classifier 20 and are deposited on a continuously driven belt 47 which advances the cartons across the scale platform 26. The belt may be made of a band of nylon which is substantially as wide as the scale platform and which forms a loop around two horizontally spaced idler rollers 48 and 49 (FIG. 5) generally alined with the scale platform 26 and around a drum 50 disposed beneath the roller 48, the belt being guided between the roller 49 and the drum 50 by a stationary sheet metal channel 51. On the forward side of the scale platform is a stationary approach platform 52 while on the opposite side of the scale platform is a discharge platform 53, the ends of the scale platform being spaced from the adjacent ends of the two stationary platforms as illustrated in FIG. 5 and the three platforms together forming a horizontal run of the conveyor belt 47.

Maintaining the tension of the belt 47 is a roller 54 which bears against the outside of the belt between the idler roller 48 and the drum 50. The tensioning roller 54 is supported between the upper ends of generally vertical arms 55 (FIGS. 2 and 4) whose lower ends are fast on a horizontal shaft 56 journaled on the frame 25 in brackets 57. Clamped to the shaft 56 intermediate the ends thereof is a downwardly extending arm 58 and a screw 59 projects through an end wall of the frame and bears against this arm. The roller 54 is urged against the belt by gravity and thus the tensioning effect may be adjusted by turning the screw 59 to change the angle of the arms 55 with respect to the vertical, the screw being held in the adjusted position by a lock nut 60.

Figures 5, 6, 7, 8:
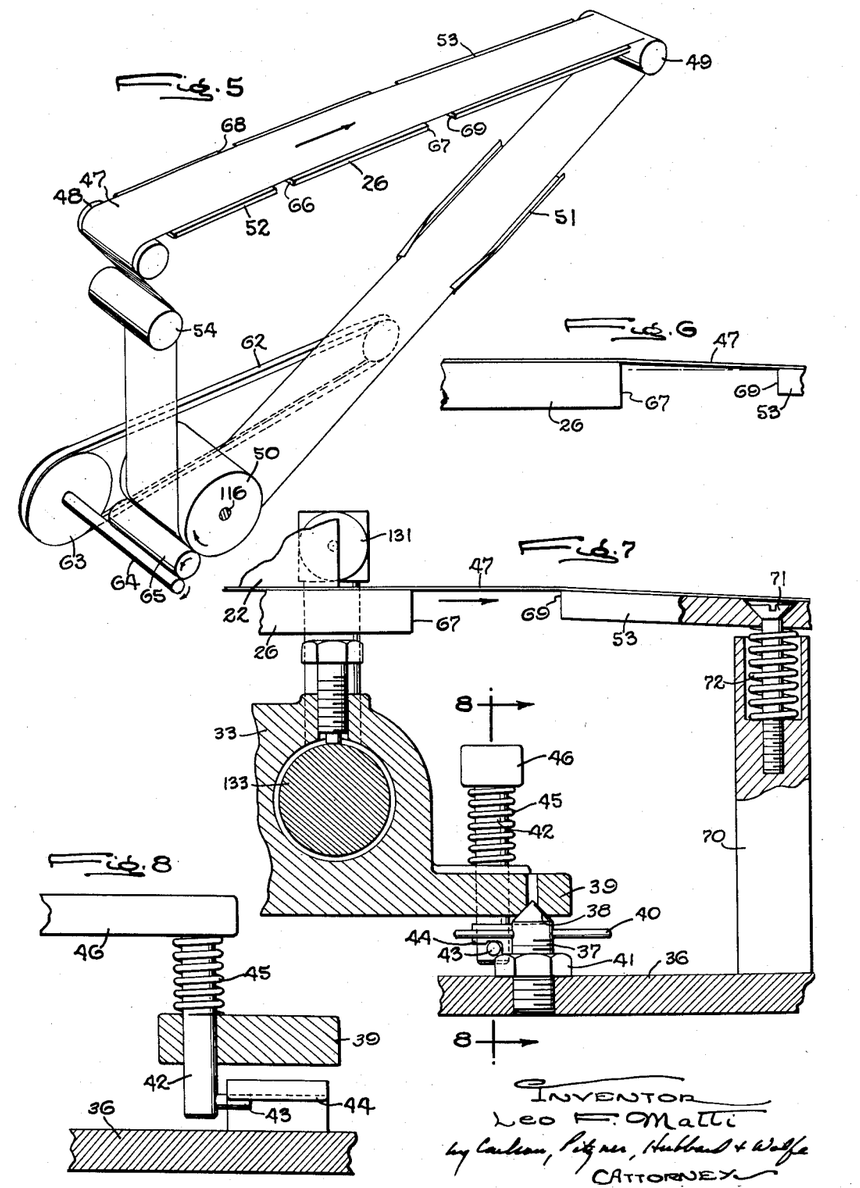
FIG. 5 is a perspective view of the belt and the mechanism for driving the belt.
FIG. 6 is an enlarged fragmentary side view of the belt and the scale platform.
FIG. 7 is an enlarged fragmentary sectional view taken along the line 7—7 in FIG. 2.
FIG. 8 is a fragmentary sectional view taken along the line 8—8 in FIG. 7.

To drive the belt 47, a motor 61 (FIG. 4) is mounted within the frame 25 and, through the medium of a belt 62 and a pulley 63, drives a horizontal shaft 64 which is journaled in the frame and is spaced outwardly from the drum 50 (see FIG. 5). A rubber roller 65 is placed between the shaft and the drum so that it rests on both and presses the belt against the drum. In this way, turning of the shaft 64 is transmitted through the roller 65 to the drum 50 and the roller and the drum together advance the belt 47. The roller is free to float in the space between the shaft and the drum and, because of this, it is capable of moving slightly toward or away from the drum which it does automatically in response to decreases or increases in pressure between it and the belt. Thus, the roller is effective to maintain a uniform pressure on the belt and this results in a constant speed drive. If desired, the motor 61 may drive a pump 64ª which provides a source of compressed air to maintain the interior of the head 28 under a slight pressure.

According to one aspect of the invention, the belt 47 and the platforms 26, 52 and 53 are arranged to cooperate in a novel manner so that the effect of the weight of the belt on the scale platform 26 remains constant at all times. Thus, the head 28 may be calibrated to compensate for the weight on the scale platform due to the belt and this calibration will be accurately effective throughout the entire operation of the weight classifier 20. To this end, the three platforms are arranged so that the belt bears on the end edges 66 and 67 (FIGS. 5, 6 and 7) of the scale platform 26 and on the adjacent end edges 68 and 69 of the approach and discharge platforms 52 and 53 respectively. As a result, the scale platform uniformly supports one half of the weight of the unsupported span of belt between the scale platform and the adjacent stationary platform.

To insure that the belt 47 bears on the edges 66, 67, 68 and 69 of the three platforms, the approach and discharge platforms 52 and 53 are inclined upwardly toward the scale platform 26 as shown most clearly in FIGS. 4, 6 and 7. In this way, the belt bends over the various platform edges and this insures that the latter edges bear against the belt. The approach and discharge platforms are mounted on the frame 25 so that they may be adjusted to obtain the proper inclination. For this purpose, the two platforms are supported adjacent their four corners by posts 70 (FIGS. 4 and 7) upstanding from the plate 36 by means of screws 71 which project through the platform and are threaded into the posts. Compression springs 72 encircle the screws and act between the posts and the underside of the platforms so as to hold the latter up against the heads of the screws. Thus, by adjusting the various screws, the approach and discharge platforms may be located at the proper height relative to the scale platform and may be given the desired inclination.

Means is provided to classify the cartons 22 according to their weight. Herein this means is effective to let cartons of the proper weight continue along the path of the belt 47 while it removes underweight cartons and displaces overweight cartons so as to give a visual indication of the number of cartons which have received too much material from the dispenser 23. As shown in the drawings, the classifying means may comprise an arm 73 which is inactive when the carton is within the range of normal weight, which pushes an underweight carton laterally off the belt and onto a chute 74 and which shifts an overweight package toward the front edge of the belt. The arm is fixed to and projects horizontally from the upper end of a vertical shaft 75 disposed beyond the weighing head 28 and behind the belt and journaled in bearings 76 (FIG. 9) which are mounted on the frame 25.

Figures 9, 10, 11:
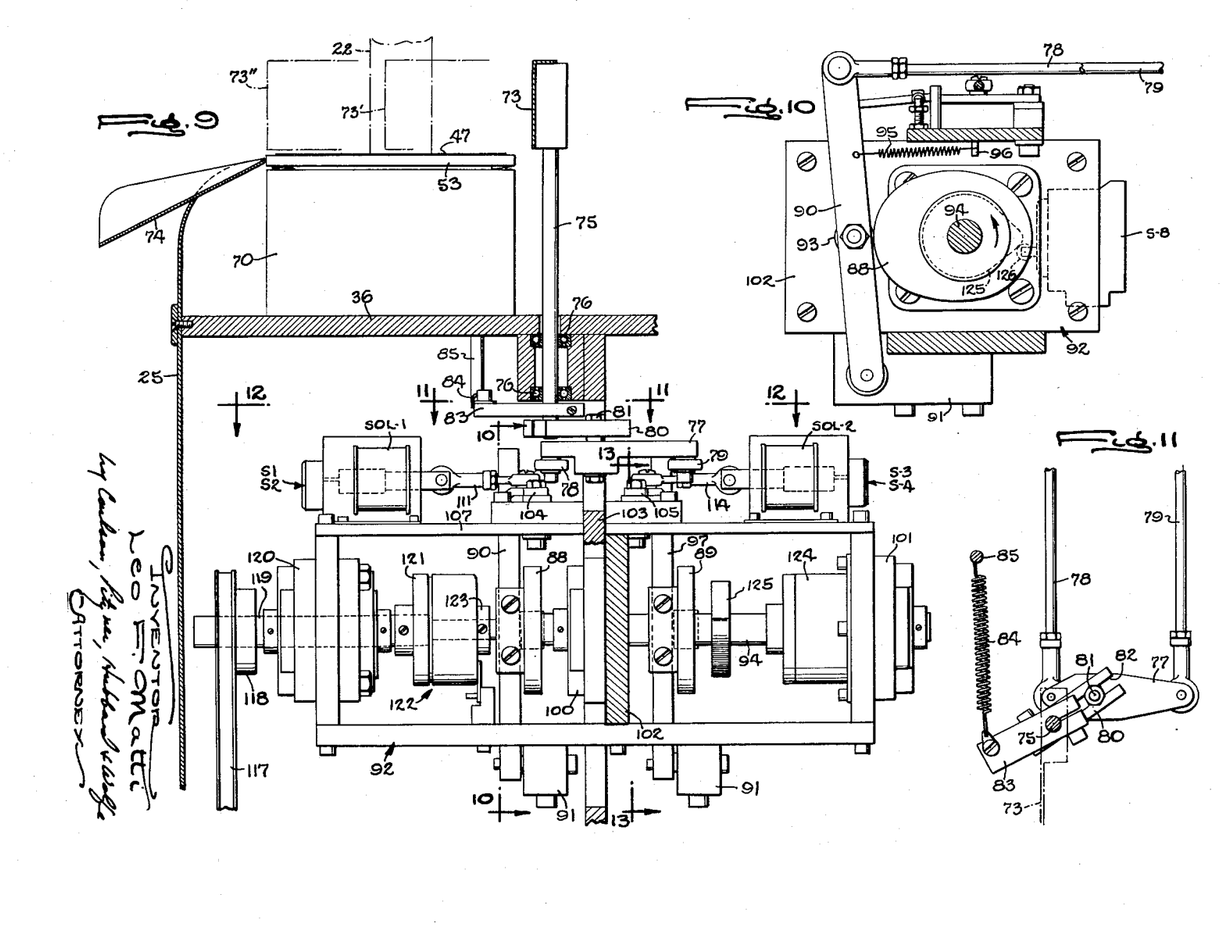
FIG. 9 is an enlarged fragmentary sectional view taken along the line 9—9 in FIG. 4.
FIG. 10 is a fragmentary sectional view taken along the line 10—10 in FIG. 9.
FIG. 11 is a fragmentary sectional view taken along the line 11—11 in FIG. 9.

When the carton 22 is within the desired weight range, the shaft 75 does not swing the arm 73 which remains in its normal position parallel to the belt as shown in FIG. 9. The arm 73 swings across the belt to the position 73″ in response to an underweight package so as to push this package off the belt and onto the chute 74. An overweight package causes the arm to swing in the same manner but through a smaller arc, that is, to the position indicated at 73′ so that such a package merely is shifted to the left edge of the belt as viewed in FIG. 9.

The foregoing motions of the arm 73 are effected through the action of a differential lever 77 (FIG. 11) which responds to a signal from the weighing head 28, the signal being an indication of whether the package is normal weight or over or under the normal weight. The opposite ends of the lever are pivotally connected to horizontal links 78 and 79 which are mounted for endwise shifting but normally are held in the positions illustrated in FIG. 11. A lever arm 80 rigidly connected to the shaft 75 projects horizontally over the differential lever 77 and a bolt 81 projects through the differential lever and is received in a slot 82 formed in the free end portion of the lever arm 80. The bolt 81 passes through the differential lever at a point closer to the link 78 than the link 79 and this bolt forms a pivotal connection between the differential lever and the lever arm. A second lever arm 83 is similarly clamped to the shaft 75 and projects laterally from the shaft in the direction opposite to the lever arm 80. A contractile spring 84 acts between the free end of the lever arm 83 and a pin 85 rigid with the frame so that the spring tends to turn the shaft 75 clockwise as viewed in FIG. 11.

Figure 12:
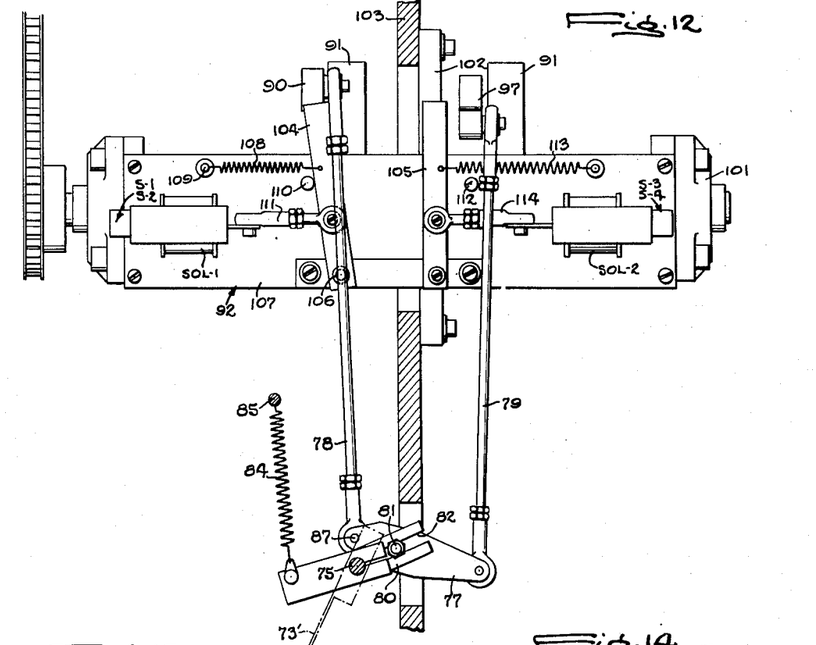
FIG. 12 is a fragmentary sectional view taken along the line 12—12 in FIG. 9.
Figure 14:
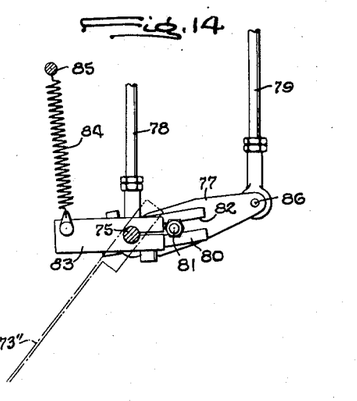
FIG. 14 is a view similar to FIG. 11 but showing the parts in a different position.

With both of the links 78 and 79 held against endwise shifting, the spring 84 is ineffective to turn the shaft 75 and thus the classifying arm 73 remains in its normal or inactive position illustrated in FIG. 1. This is the condition which prevails as long as the packages passing over the scale platform 26 are within the range of acceptable weight. Should a package be underweight, the link 78 is released and is free to shift forward from the position shown in FIG. 11 to the position shown in FIG. 14. When this link is released, therefore, the spring 84 is able to turn the shaft 75, the differential lever thereby swinging about the pivotal connection 86 between it and the other link 79. As a result, the arm 73 swings across the belt 47 to the position shown in phantom in FIG. 14. If the carton happens to be overweight, the link 79 is released for endwise shifting while the link 78 is held in its normal position. Release of this link also permits the spring 84 to turn the shaft since the differential lever 77 is free to swing about the pivotal connection 87 between it and the link 78 as illustrated in FIG. 12. In this case, however, the shaft 75 turns through a smaller angle than in the case of an underweight carton due to the fact that the bolt 81 is off center relative to the differential lever. For this reason, the arm 73 swings only part way across the belt to the position shown in phantom in FIG. 12. Thus, through the action of the differential lever, underweight packages are moved off of the belt while overweight packages are displaced laterally but remain on the belt.

Figure 13:
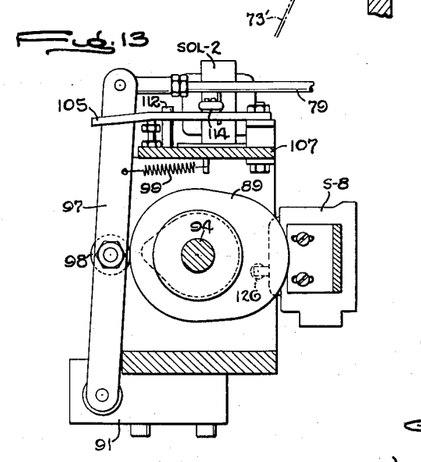
FIG. 13 is a fragmentary sectional view taken along the line 13—13 in FIG. 9.

To achieve the foregoing action of the differential lever 77, each of the links 78 and 79 is associated with an individual cam but is under the control of the cam only for the appropriate weight condition of the carton 22 being weighed. Thus, the cam 88 associated with the link 78 permits the latter to shift endwise if the carton is underweight while the cam 89 associated with the link 79 permits this link to shift when the carton is overoverweight. For this purpose, the rear end of the link 78 is pivotally connected to a generally vertical lever 90 (FIG. 10) which is fulcrumed at its lower end on a block 91 rigid with the underside of a rectangular open framework 92 and carries a follower roller 93 intermediate its ends. The roller coacts with the cam 88 which is fast on a horizontal cam shaft 94 and is urged into engagement with the cam by a contractile spring 95 which acts between a stationary pin 96 and the lever 90. A similar lever 97 (FIG. 13) fulcrumed on another block 91 is connected to the other link 79 and also carries a follower 98 urged into engagement with the cam 89 by a contractile spring 99. The camshaft 94 is journaled in spaced bearings 100 and 101 which are supported in the framework 92. A center plate 102 of the latter is bolted to a partition 103 of the frame 25 as shown in FIG. 12 so that the framework is rigid with the housing frame.

Under normal conditions, that is, either when no carton is being weighed or when the carton on the scale platform 26 is within the proper range of weight, the links 78 and 79 are held in their inactive positions shown in FIG. 11. This is achieved by using blocking members 104 and 105 which engage the levers 90 and 97 respectively and hold these levers in their starting position which is the position shown in FIG. 10. Herein, the blocking member 104 for the link 78 is a lever fulcrumed at 106 on the upper plate 107 of the framework 92. A contractile spring 108 acting between the blocking lever and a pin 109 upstanding from the plate 107 normally holds the blocking lever against a stop pin 110 (FIG. 12) and, in this position, the end of the blocking lever engages the lever 90 to prevent the link 78 from shifting forward.

In order to release the lever 90 and permit endwise shifting of the link 78 in response to the presence of an underweight carton on the scale platform 26, a solenoid SOL-1 responds to the signal from the head 28 in a manner to be described and swings the blocking lever 104 out of engagement with the lever 90. For this purpose, the solenoid is mounted on the plate 107 and its armature is pivotally connected through a link 111 to the blocking lever (FIG. 12). When the solenoid is energized, the link 111 moves to the right as viewed in FIG. 12 and swings the blocking lever away from the lever 90 against the action of the spring 108. A similar arrangement is utilized in connection with the blocking lever 105, the latter normally being held in the blocking position against a pin 112 by a contractile spring 113 and being moved out of engagement with the lever 97 by a solenoid SOL-2 which is connected to the blocking lever through a medium of a link 114.

As illustrated in FIGS. 4 and 9, the cam shaft 94 is driven by the drum 50 through the medium of a sprocket wheel 115 on the drum shaft 116, a chain 117 and a sprocket wheel 118 fast on a shaft 119 which is alined with the cam shaft and is journaled in a bearing 120 on the framework 92. The shaft 119 is driven continuously and is connected to one element 121 of an electromagnetic clutch 122, the other element 123 of the clutch being secured to the cam shaft. Thus, when the clutch 122 is engaged, the cam shaft is turned. An electromagnetic brake 124 is energized alternately with the clutch so that, when the clutch is engaged, the brake is released and the brake is energized to stop the cam shaft 94 when the clutch is disengaged. The arrangement is such that the camshaft is rotated through one revolution each time an overweight or underweight carton passes across the scale platform 26 and, for this purpose, the appropriate solenoid is, in a manner to be described, deenergized before the revolution is completed. The armature of the solenoid, however, cannot return until the corresponding blocking lever 104 or 105 is permitted to swing back. This occurs upon completion of one revolution when the cam 88 or 89 has swung the associated lever 90 or 97 back to the starting position. At that time, the blocking lever swings in front of the follower lever and the armature of the solenoid returns. This opens the switch S-2 or the switch S-4 and closes the switch S-1 or the switch S-3 and disengages the clutch 122 and engages the brake 124 to stop the camshaft.

With the foregoing arrangement, the links 78 and 79 normally are in the retracted position shown in FIG. 11 and the clutch 122 is disengaged so that the camshaft 94 is stationary. When a carton of the proper weight passes over the scale platform 26 the clutch remains deenergized and, as a result, there is no turning of the differential lever 77 and the classifying arm 73 remains in its inactive position to permit this carton to continue along the path of the belt 47 without being displaced. If an underweight carton passes across the scale platform, the head 28 will produce a signal which, in a manner to be described, deenergizes the brake 124 and energizes the clutch 122 to start the camshaft 94 rotating. Simultaneously, the head energizes the solenoid SOL-1 to shift the blocking lever 104 out of engagement with the lever 90.

Thus, as the cam 88 turns with the camshaft, the spring 95 holds the follower 93 against the cam so that the link 78 is shifted forwardly. This permits the spring 84 to turn the lever arms 80 and 83 through the angle permitted by the turning of the differential lever 77 about the pivot 86 thereby turning the shaft 75 and swinging the classifying arm 73 across the belt 47 to push the carton off the belt and onto the chute 74. When the camshaft has completed one revolution, the cam 88 has returned the lever 90 and the link 78 to the starting position and the clutch 122 is disengaged and the brake 124 is energized thereby stopping the camshaft. The parts, therefore, again are in their starting position preparatory to the weighing and classifying of the next carton. Generally, the same operation occurs in the case of an overweight carton except, in that instance, the solenoid SOL-2 is energized whereby the link 79 shifts forward with the result that the shaft 75 and arm 73 are swung through a shorter angle merely to displace the carton on the belt.

The circuit responsive to the head 28 is arranged so that there is no charge across the condenser 29 when a package within the present normal weight range is on the scale platform 26 while there is a plus or minus charge across the condenser for overweight and underweight packages. As a result, there would be a relatively large charge across the condenser when there was no package on the scale and a comparatively long time would be required for the condenser to discharge to a value corresponding to the weight of a package when the latter was delivered onto the scale platform. To eliminate the time required for such discharging of the condenser 29, the present invention contemplates deenergizing the weighing circuit until a package actually is on the platform 26 so that the condenser never is charged above a value corresponding to the actual weight of a package. This is achieved by utilizing a sensing element 127 which detects the presence of a package on the scale platform and which thereupon operates to energize the weighing circuit.

Herein, the sensing element 127 is a photoelectric cell which is spaced inwardly from the forward end of the scale platform 26 so as to be energized by a carton 22 when the latter has moved completely onto the platform. The photoelectric cell 127 is disposed on one side of the platform and a light source 128 is located on the opposite side and directs a light beam toward the photoelectric cell. These elements are spaced from the end of the scale platform a distance substantially equal to the width of a carton so that the carton interrupts the beam of light as soon as the trailing edge of the carton reaches the forward edge 66 of the scale platform. In order to make the photoelectric cell adjustable for cartons of different widths, the cell and the light source 128 are mounted on arms 129 (FIG. 4) which project upwardly from the opposite ends of a shaft 130. The latter extends through and is journaled in the block 33 as shown in FIG. 4 so that the photoelectric cell and the light source may be moved in unison toward or away from the forward edge 66 of the scale platform by rocking the shaft 130 about its axis. The shaft is held in the selected position of adjustment by a suitable set screw.

As illustrated in FIG. 18, the photoelectric cell 127 energizes a relay 1E which closes contacts 1E–1 in the circuit of the relay RR. The latter thereby is energized opening contacts RR–2 in the shunt circuit of the condenser 29 and closing the contacts RR–3 to charge the condenser in accordance with the weight of the carton on the scale platform 26. The relay RR also closes contacts RR–1 which complete a holding circuit for the relay which thus remains energized upon deenergization of the relay 1E.

After the weighing circuit is energized, a short period of time, on the order of 0.15 to 0.30 of a second, is permitted to elapse before the output of the phase discriminating circuit 31 actuates the classifying function of the arm 73 to permit the charge across the condenser 29 to reach a value corresponding to the weight of the package on the scale platform 26. This time delay is achieved by the carton traveling across the platform and actuating a second sensing element 131 disposed adjacent the rear end of the platform. Like the first, the second sensing element is a photoelectric cell with an opposed light source 132. The cell and the light source are mounted on the opposite ends of a shaft 133 (FIG. 7) similar to the shaft 130 for adjustment toward and away from the rear edge 67 of the scale platform and are held in the adjusted position by a set screw 134.

When the light beam to the photoelectric cell 131 is interrupted by a carton, a relay 2E (FIG. 18) is energized and the contacts 2E–2 of this relay complete the circuit of a relay CR1 which is connected across the output of a full wave rectifier 135. Contacts CR1–2 of the relay CR1 complete the circuit of a relay RS whose contacts RS–1, RS–2 and RS–3 connect information relays OK, UN and OV to the output terminals A, B and C of the phase discriminating circuit 31, the circuits of these relays also being completed through the contacts CR1–1 of the relay CR1. Thus, if the carton is within the proper weight range, there will be a signal at the terminal A and, as a result, the relay OK will be energized. Similarly the relay UN will be energized if the carton is underweight and the relay OV will be energized if the carton is overweight. Since the light source 132 is interrupted only momentarily by the carton, the relay 2E and thus the relay CR1 will be deenergized. The normally closed contacts 2E–1 of the relay 2E, however, provided a closed circuit for whichever information relay has been energized, this circuit being completed by the individual contacts OK–2, UN–2, and OV–2 of these relays.

When the relay OK is energized, it completes its own holding circuit through contacts OK–2 and it also completes a circuit to a light 136, which conveniently may be green, through contacts OK–1. In the case of an underweight carton, the relay UN closes its own holding circuit through contacts UN–2 and the circuit of the solenoid SOL–1 and the circuit of a differently colored light 137 are completed through contacts UN–1. As described above, the solenoid SOL–1 when energized shifts the blocking lever 104 so that the follower 93 may contact the cam 88. The armature of the solenoid also opens a switch S–1 in the circuit of the coil of the brake 124 to disengage the latter and closes a switch S–2 in the circuit of the coil of the clutch 122 to start the camshaft 94 turning. Similarly, the relay OV is energized in response to an overweight package and closes a holding circuit through contacts OV–2 and the circuits of solenoid SOL–2 and a signal lamp 138 through contacts OV–1. This solenoid also deenergizes the brake and energizes the clutch through switches S–3 and S–4 respectively.

The relay CR1 also closes contacts CR1–3 to energize a relay CR2. Because of a resistor RES–2 in series with the latter relay and a condenser 139 connected in parallel, there is a short time delay in the energization of the relay CR2. This time delay permits the relay RS to energize the appropriate information relay before the relay RS is deenergized by the opening of the contacts CR2–2. The relay CR2 also opens normally closed contacts CR2–1 which deenergize the relay RR and this opens the contacts RR–3 in the weighing circuit and closes the contacts RR–2 in the shunt circuit of the condenser 29 to discharge the condenser and prepare the weighing circuit for the next carton.

When either of the relay UN or the relay OV is energized, the camshaft 94 begins to turn. Such turning continues even though the carton has passed the second photoelectric cell 131 since the appropriate information relay remains energized through its own holding circuit until a cam 125 on the camshaft opens a switch S–8 which is in the circuit of the information relays. When this switch is opened, the information relays are deenergized and this deenergizes the solenoids SOL–1 and SOL–2 so that, upon completion of one revolution of the camshaft, the clutch 122 is disengaged and the brake 124 engaged to stop the camshaft preparatory to the classifying of the next carton.

With the arrangement described above, the classifier 20 is placed in operation by depressing a "Start" push button (FIG. 18) which connects a relay M across power lines L–1 and L–2, the various relays and solenoids of the control circuit also being connected across these lines with the exception of the relays CR1 and CR2. When the relay M is energized, it completes a holding circuit through contacts M–1 and energizes the motor 61 by closing contacts M–2 which connect the motor to a source of alternating current through lines m, m, m. As a result, the belt 47 is driven to advance the cartons 22 from the packaging machine 21 across the scale platform 26. As the first carton interrupts the light beam to the photoelectric cell 127, the relay 1E is energized and, through the contacts 1E–1, energizes the relay RR. The latter, by opening the contacts RR–2 and closing the contacts RR–3, energizes the weighing circuit so that there is a signal across the appropriate one of the terminals A, B and C of the phase discriminating circuit 31. As the carton continues across the scale platform, it interrupts the light beam to the second photoelectric cell 131 which thereupon energizes the relay 2E. By closing the contacts 2E–2, this relay energizes the relay CR1 which closes the contacts CR1–2 to energize the relay RS, the latter completing the circuits of the information relays OK, UN and OV.

If the first carton is within the range of acceptable weight, there will be a signal at the terminal A so that the relay OK is energized and this in turn closes the contacts OK–1 to light the signal lamp 136. Shortly after the relay CR1 has been energized, the relay CR2 is energized by the closing of the contacts CR1–3. This opens the contacts CR2–2 in the circuit of the relay RS and also opens the contacts CR2–1 in the circuit of the relay RR. With the latter deenergized, the weighing circuit is opened at the contacts RR–3 and the condenser 29 is discharged through the shunt circuit by the closing of the contacts RR–2. Thus, there is no longer a signal at any of the terminals of the circuit 31 and this circuit together with the control circuit again is in condition for the weighing of the next package. The lamp 136, however, remains lit until the cam 125 opens the switch S–8 to deenergize the relay OK which has remained energized through the contacts OK–2.

The next package conditions the weighing circuit in the same manner. If this package should be underweight, a signal will appear at the terminal B so that the relay UN is energized instead of relay OK. This lights the lamp 137 and energizes a solenoid SOL–1. The latter opens the switch S–1 to disengage the brake 124 and closes the switch S–2 to engage the clutch 122 so that the camshaft 94 now is driven through the chain 117. At the same time, the solenoid swings the blocking lever 104 away from the lever 90 so that the follower 93 remains in contact with the cam 88 as the shaft turns. With the parts in this condition, the spring 95 pulls the lever 90 forward as the cam 88 turns thereby shifting the link 78 endwise and swinging the differential lever 77 about the pivot 86. This permits the spring 84 to turn the shaft 75 and swing the arm 73 across the belt and push the carton onto the chute 74. As the camshaft continues to turn, the cam 125 opens the switch opens the switch S–8 thereby deenergizing the relay UN. This deenergizes the solenoid SOL–1 so that the clutch 122 is disengaged and the brake 124 engaged to stop the camshaft 94. The various mechanisms then again are in condition to weigh and classify the next package.

In the case of an overweight carton, the signal appears at the terminal C to energize the relay OV which, through the solenoid SOL–2, controls the brake 124 and the clutch 122 to produce a single revolution of the camshaft 94 in the same manner as the relay UN. In this case, however, the link 79 is shifted endwise while the link 78 is held so that the differential lever swings about the pivot 87. This produces a shorter swing of the arm 73 so that the package merely is displaced laterally on the belt rather than being moved off of the belt and onto the chute 74.

Mechanism 140 is provided for correcting the operation of the dispenser 23 in response to the overweight and underweight signals of the phase discriminating circuit 31 so as to reduce the number of cartons of incorrect weight subsequently produced by the packaging mechanism 21. In the present instance, this mechanism comprises a shaft 141 (FIGS. 15, 16 and 19) which is stepped in one direction in response to underweight cartons and in the opposite direction in response to overweight packages and periodically such stepping of the shaft 141 is utilized to correct the dispenser 21. This is achieved by returning the shaft to its original position and, during the return of the shaft, by connecting the latter to a correcting shaft 142 (FIG. 1) on the dispenser so that the dispenser is adjusted by an amount corresponding to the number of times and the direction that the shaft 141 has been stepped.

Figure 15:
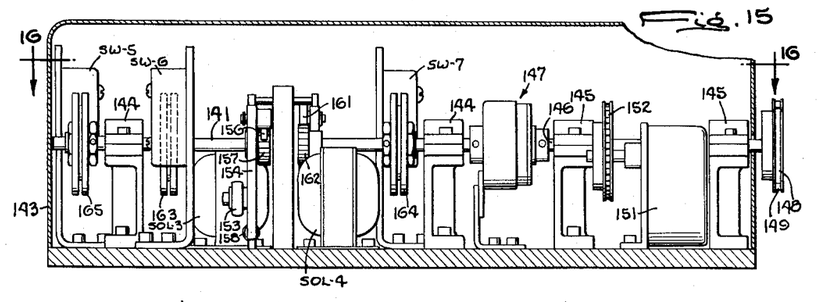
FIG. 15 is an enlarged sectional view taken along the line 15—15 in FIG. 1.
Figure 16:
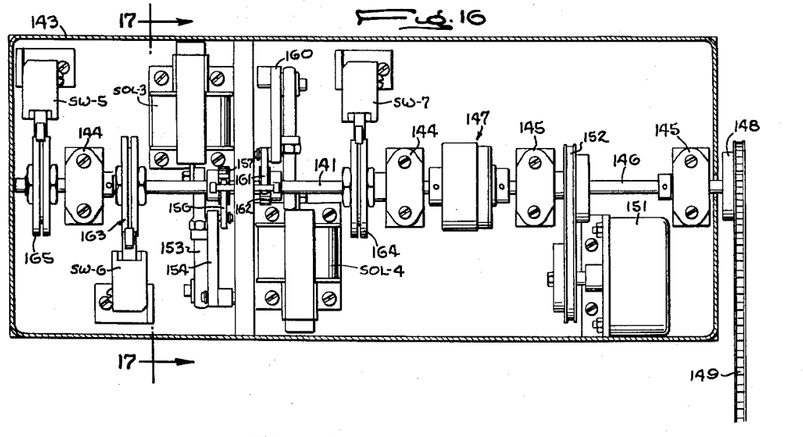
FIG. 16 is a sectional view taken along the line 16—16 in FIG. 15.

As shown in FIGS. 1, 15 and 16, the shaft 141 is disposed within a housing 143 located near the dispenser 23 and is journaled in spaced bearings 144. Alined with the shaft and journaled in bearings 145 is a second shaft 146 and the two shafts are coupled by an electromagnetic clutch 147. The outer end of the shaft 146 carries a sprocket wheel 148 which, through a chain 149, is connected to a sprocket wheel 150 on the adjusting shaft 142 of the dispenser. A reversible motor 151 disposed within a housing 143 is connected by means of a chain 152 to the shaft 146 and, in a manner to be described, is energized when the clutch 147 is engaged to return the shaft 141 to its original position and simultaneously turn the shaft 146 to produce a similar turning of the adjusting shaft 142.

Figure 17:
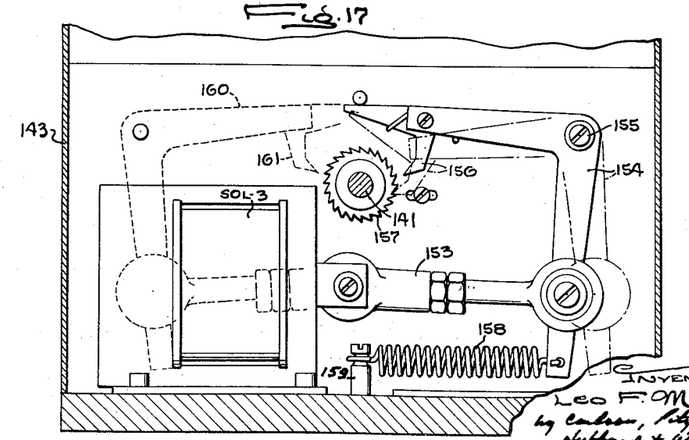
FIG. 17 is an enlarged fragmentary sectional view taken along the line 17—17 in FIG. 16.

The shaft 141 is stepped in one direction or the other in response to the energization of the relays UN and OV and, for this purpose, the relay UN closes contacts UN–3 in the circuit of a solenoid SOL–3 (FIG. 19) while the relay OV similarly closes contacts OV–3 in a circuit of a solenoid SOL–4. As illustrated in FIGS. 16 and 17, the solenoid SOL–3 is disposed on one side of the shaft 141 and its armature is connected through a link 153 to one leg of a bell crank lever 154. The latter is fulcrumed in the housing 143 at 155 and the other arm of this lever carries a pawl 156 which is engageable with the teeth of a ratchet wheel 157 keyed to the shaft 141. A contractile spring 158 acting between a stationary pin 159 and the bell crank lever normally holds the pawl out of engagement with the ratchet wheel in the position shown in full lines in FIG. 17. When the solenoid SOL–3 is energized, the lever is swung counterclockwise to the position shown in broken lines and the pawl thereby engages a tooth of a ratchet wheel and turns the shaft 141 one step. The solenoid SOL–4 similarly turns a bell crank lever 160 which carries a pawl 161 for engaging the teeth of a ratchet wheel 162 also keyed to a shaft 141. Since the solenoid SOL–4 is on the other side of the shaft, this solenoid steps the shaft in the opposite direction.

Keyed to the shaft 141 is a cam 163 which, when the shaft is turned from its neutral position by the solenoid SOL–3 in response to an underweight package, closes a switch SW–6 in a circuit of a relay UR. Similarly, a cam 164 on the shaft closes a switch SW–7 in the circuit of a relay OR in response to an overweight package. The cam is arranged so that neither of these switches are closed when the shaft is in the starting position illustrated in FIG. 19. It will be apparent that a predetermined number of underweight packages will be balanced by the same number of overweight packages so that the shaft 141 will be returned to its original position and both of the switches SW–6 and SW–7 will be opened. The switch SW–6 will be closed only when there has been a preponderance of underweight packages and the switch SW–7 will be closed only when there have been more overweight packages than underweight packages. With either of the switches closed, however, the corresponding relay UR or OR will remain deenergized since a switch SW–5, which is in the circuits of both of these relays, is open.

Figure 19:
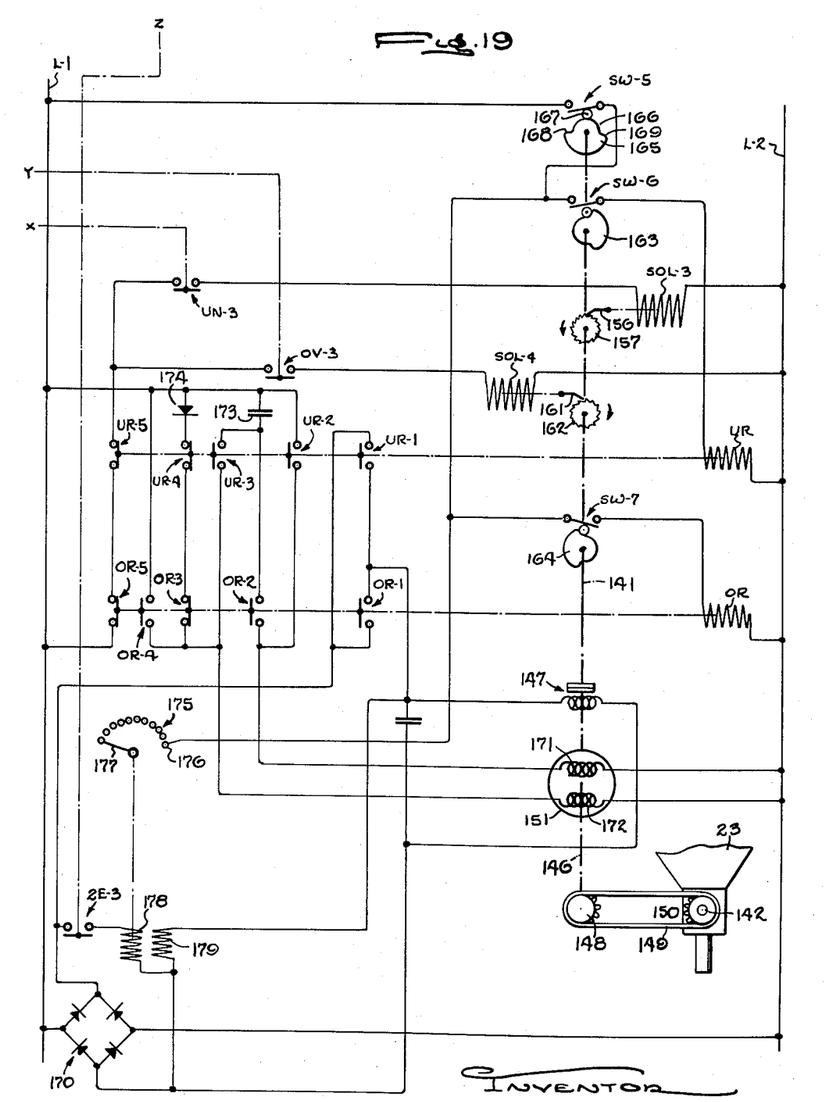
FIG. 19 is a schematic view of the circuit used to correct the operation of the dispensing device.

The switch SW–5 is under the control of a cam 165 which is fast on a shaft 141 and which is effective to close the switch when the overweight cartons have exceeded the underweight cartons by a predetermined number, for example, five, or vice versa. For this purpose, the cam is formed with a dwell 166 (FIG. 19) and, when the shaft 141 is in its original position, the follower 167 for the cam is in the center of the dwell. When the shaft 141 has been turned a sufficient number of steps in either direction, the follower 167 engages either a rise 168 or a rise 169 on the cam 165 and closes the switch SW–5. If there have been more underweight packages than overweight packages, the follower engages the rise 169 and, since the switch SW–6 will be closed at this time, the relay UR is energized. Similarly, if there are more overweight packages than underweight packages, the follower engages the rise 168 to energize the relay OR, the switch SW–7 having previously been closed. Energization of either the relay UR or the relay OR causes the clutch 147 to engage and energizes the motor 151 to drive the shaft 141 back to its original position thereby to turn the shaft 142 and effect an adjustment of the dispenser device 23. When the relay UR is energized, for example, its contacts UR–1 are closed to complete the circuit of the clutch coil across a full wave rectifier 170 which is connected across the lines L–1 and L–2. This engages the clutch. Also, contacts UR–2 and UR–3 are closed to complete the circuits of the coils 171 and 172 of the motor 151, a condenser 173 being included in the circuit of the coil 172 to shift the phase of the current to that coil. With the motor thus energized, it turns in the proper direction to rotate the shaft 141 back to its initial position as shown in FIG. 19.

The relay UR also opens normally closed contacts UR–4 which, when closed, connects the motor coil 172 across the lines L–1 and L–2 through a half wave rectifier 174. This produces a dynamic braking in the motor when the latter is deenergized. A second set of normally closed contacts UR–5 are opened to disable the solenoids SOL–3 and SOL–4 so that there is no danger of their corresponding pawls 156 and 161 and ratchet wheels 157 and 162 engaging and interfering with the turning of the shaft 141 when this shaft is being driven by the motor 151.

A similar set of contacts is actuated by the relay OR. Thus, contacts OR–1 cause the clutch 147 to engage and contacts OR–2 and OR–4 energize the motor 151. In this case, however, the motor coil 171 is connected to the condenser 173 so that the motor turns in the opposite direction. Associated with the relay OR are normally closed contacts OR–3 which apply the dynamic braking effect and normally closed contacts OR–5 which disable the two solenoids SOL–3 and SOL–4.

Means is provided for producing a correction of the dispensing device 23 according to the number of overweight and underweight packages within a group of a predetermined number irrespective of whether there has been a preponderance of one or the other sufficient to close the switch SW–5. Herein, this means comprises a stepping switch 175 which is responsive to the successive packages being weighed by the head 28 and whose terminal contact 176 completes a circuit in parallel with the switch SW–5 so that either the relay UR or the relay OR, depending on the number and type of packages of incorrect weight in the group counted by the stepping switch, is energized. Thus, a correction of the dispensing device 23 is made each time a complete group of packages is weighed provided that the shaft 141 has been displaced from its original position by underweight or overweight packages.

In the form of the invention illustrated in the drawings, each group is made up of ten packages and, accordingly, the stepping switch 175 includes ten contacts. The movable contact 177 of the switch is actuated by a conventional pulsing coil 178 which is connected across the output of the rectifier 170 through the normally open contacts 2E–3 of the relay 2E. With this arrangement, the pulsing coil 178 is energized each time a package passes the photoelectric cell 131 and, therefore, the contact 177 is moved one step for every package that crosses the scale platform 26. A reset coil 179 is connected in series with the coil of the clutch 147 so that, each time the clutch is engaged to turn the shaft 141 back to its initial position, the movable contact 177 is returned to the first stationary contact of the stepping switch 175. In other words, the stepping switch begins to count a new group of packages each time a correction of the dispensing device 23 is made whether the correction is initiated by the switch SW–5 or by the stepping switch 175.

Should every package of a group counted by the stepping switch 175 be within the correct range of weight or should the number of overweight packages exactly equal the number of underweight packages within the group, the shaft 141 will be in its original position when the movable contact 177 of the stepping switch reaches the terminal contact 176. Under these conditions, both of the switches SW–6 and SW–7 will be opened so that neither the relay UR or the relay OR will be energized. As a result, neither the clutch 147 nor the motor 151 will be energized and there will be no correction of the dispensing device. Also, the reset coil 179 will not be energized and thus the movable contact 177 remains idle at the terminal contact 176. The various parts remain in this position until the first package of incorrect weight crosses the scale platform 26. Should this package be underweight, the relay UR will be energized immediately and a one unit correction to the dispenser 23 will be made. A similar correction for overweight will be made if that package should be above the desired weight range.

It will be observed that the foregoing system effects a correction of the dispensing device 23 in three different ways and this provides a rapid initial correction when the dispenser deviates from the desired performance by large amounts such as might be the case at the start of a packaging operation. This correction is effected by the cam 165 and the switch SW–5 which will produce an immediate correction whenever the dispenser fills successive packages with too little or too much material. Then the system provides a finer adjustment since it corrects the dispenser for each underweight or overweight trend as detected within the group counted out by the stepping switch 175. Ultimately, the dispenser is adjusted quite accurately in which case the movable contact 177 tends to idle at the terminal contact 176. Under this condition, a small correction will be made as soon as the first package of improper weight crosses the scale platform. Thus, the system adjusts the dispenser rapidly and accurately maintains the proper operation of the dispenser.

I claim:

1. A machine for weighing successive packages comprising a frame, a horizontal scale platform having a normal position and operable to deflect vertically under the weight of a package on the platform, means responsive to the deflection of said platform and operable to produce a signal corresponding to the amount of deflection, two stationary platforms, one disposed at each end of said scale platform and each spaced from the adjacent end of the scale platform, an endless belt having a generally horizontal run extending across said three platforms, said stationary platforms being inclined upwardly toward said scale platform to cause said belt to bear against the edges of said stationary platforms adjacent said scale platform whereby the stationary platforms uniformly support the belt throughout the weighing operation, said scale platform and said edges of said stationary platforms being substantially in a common horizontal plane when the scale platform is in said normal position, and means to drive said belt endwise thereby to advance packages across said scale platform.

2. A machine for weighing successive packages, said machine having, in combination, a frame, horizontal scale platform mounted on said frame to deflect vertically under the weight of a package on the platform, means responsive to deflection of said platform and operable to produce a signal corresponding to the amount of deflection, two stationary platforms, one disposed at each end of said scale platform and each spaced from the adjacent end of the scale platform, an endless belt having a generally horizontal run extending across said three platforms, a plurality of idler rollers including a drum supporting said belt, a driving roller laterally spaced from said drum and disposed on the opposite side of said belt, power actuated means for turning said drive roller, and an intermediate roller of a diameter greater than the space between said drive roller and said drum and resting freely on the drive roller to be urged by gravity toward the drum thereby to press said belt against said drum, said intermediate roller being turned by said drive roller thereby to turn said drum and advance said belt.

3. A machine for weighing a succession of packages, said machine comprising a frame, a horizontal platform mounted on said frame to deflect vertically under the weight of a package on the platform, means for delivering successive packages to said platform, a circuit responsive to deflection of said platform and including a condenser charged according to the amount which the platform deflects, a sensing element operable to detect the presence of a package arriving onto said platform and to energize said circuit thereby to charge said condenser, means responsive to said circuit and operable to produce a signal corresponding to the charge across said condenser, and mechanism operable after said signal has been produced and before said package has left said platform to deenergize said circuit.

4. A machine for weighing a succession of packages, said machine comprising a frame, a horizontal platform mounted on said frame to deflect vertically under the weight of a package on the platform, means for delivering successive packages to said platform, a circuit responsive to deflection of said platform and including a condenser charged according to the amount which the platform deflects, a sensing element operable to detect the presence of a package arriving onto said platform and to energize said circuit thereby to charge said condenser, means responsive to said circuit and operable to produce a signal corresponding to the charge across said condenser, a second sensing element operable to detect the package as the latter reaches the rear end portion of said platform, and means responsive to said second sensing element and operable to deenergize said circuit.

5. A machine for weighing a succession of packages, said machine having, in combination, a frame, a generally horizontal platform mounted on said frame to deflect vertically under the weight of a package on the platform, means for delivering successive packages to said platform, said packages arriving at the forward edge of said platform and leaving across the rear edge of said platform, a circuit responsive to deflection of said platform and including a condenser charged according to the amount which the platform deflects, a photoelectric cell disposed adjacent the forward edge of said platform to detect the presence of a package being delivered to the platform and operable to produce a signal, means responsive to a signal of said photoelectric cell and operable to energize said circuit thereby to charge said condenser, a second photoelectric cell disposed adjacent the rear edge of said platform and operable to produce a second signal when a package passes the second photoelectric cell, and mechanism responsive to the signal of said second photoelectric cell and operable to produce a weight signal corresponding to the charge across said condenser and to deenergize said circuit before the package reaches said platform.

6. A machine for classifying packages according to weight, said machine including, in combination, a frame, a generally horizontal scale platform mounted on said frame to deflect vertically under the weight of a package on the platform, an endless belt having a run extending across said platform and operable to deliver packages successively to said platform, a member disposed beyond said platform and mounted on said frame to move across said belt, means responsive to the deflection of said platform and operable to produce a normal signal when the platform deflects a predetermined amount, an underweight signal when the platform deflects a lesser amount and an overweight signal when the platform deflects a greater amount, and an actuator operable in response to an underweight signal to move said member across said belt thereby to move the package off the belt, said actuator being responsive to an overweight signal to move said member partially across said belt and to stop the member short of the edge of the belt thereby to shift the package laterally on the belt while leaving the pacakge on the belt.

7. In a machine for classifying packages according to weight, said machine comprising a frame, a generally horizontal scale platform mounted on said frame to deflect vertically under the weight of a package on the platform, an endless belt having a run extending across said platform and operable to deliver said packages successively to the platform, a horizontal arm mounted on said frame beyond said platform to swing about a vertical axis across said belt and to shift packages laterally of the belt, a differential lever having two fulcrums spaced apart along the lever and connected to said arm, said lever being operable to swing said arm through a predetermined angle when the lever turns about one fulcrum and through a greater angle when the lever turns about the other fulcrum, means responsive to the deflection of said platform and operable to produce a normal signal when the platform deflects a predetermined amount, an underweight signal when the platform deflects a lesser amount and an overweight signal when the platform deflects a greater amount, and mechanism responsive to said underweight signal to turn said lever about one of said fulcrums and to said overweight signal to turn the lever about the other of said fulcrums thereby to shift overweight packages laterally of said belt a different distance than underweight packages.

8. A machine for filling packages comprising a dispensing device operable to deposit a predetermined quantity of material in a package, a weigher operable to receive filled packages from said dispensing device and to weigh said packages successively, means responsive to said weigher to produce an overweight signal for a package heavier than a predetermined weight and to produce an underweight signal for a package lighter than a predetermined weight, a member having a normal position and movable in opposite directions from said normal position, mechanism responsive to an overweight signal to move said member in one direction and responsive to an underweight signal to move said member in the opposite direction, an element operable to sense when the number of one type of signal has exceeded the number of the other type of signal by a predetermined amount and operable to produce a correction signal, a power actuator responsive to said correction signal to return said member to said normal position, and means connecting said dispensing device to said member as the latter is returned to said normal position and operable to modify the action of said dispensing device.

9. A machine for filling packages comprising a dispensing device operable to deposit a predetermined quantity of material in a package, a weigher operable to receive filled packages from said dispensing device and to weigh said packages successively, means responsive to said weigher to produce an overweight signal for a package heavier than a predetermined weight and to produce an underweight signal for a package lighter than a predetermined weight, a member having a normal position and movable in opposite directions from said normal position, mechanism responsive to an overweight signal to move said member in one direction and responsive to an underweight signal to move said member in the opposite direction, an element operable to sense when the number of one type of signal has exceeded the number of the other type of signal by a predetermined amount and operable to produce a correction signal, a power actuator responsive to said correction signal to return said member to said normal position, means connecting said dispensing device to said member as the latter is returned to said normal position and operable to modify the action of said dispensing device, and counting mechanism operable in response to a predetermined number of packages being weighed by said weigher to activate said power actuator thereby to return said member to said normal position and modify the action of said dispensing device irrespective of the number of overweight and underweight signals.

10. A machine for weighing successive packages comprising a frame, a horizontal scale platform having a normal position and operable to deflect vertically under the weight of a package on the platform, means responsive to the deflection of said platform and operable to produce a signal comparable to the amount of deflection, two stationary platforms, one disposed at each end of said scale platform and each spaced from the adjacent end of the scale platform, an endless belt having a generally horizontal run extending across said three platforms, the edges of said stationary platforms adjacent said scale platform being in substantially the same horizontal plane as the scale platform when the latter is in said normal position whereby said belt bears against said edges and the stationary platforms uniformly support the belt throughout the weighing operation and means to drive said belt endwise thereby to advance packages across said scale platform.

11. In a machine for classifying packages according to weight, the combination of, a frame, an endless conveyor mounted on said frame and having a horizontal run operable to carry the packages along a horizontal path, weighing mechanism responsive to the weight of the packages and operable to give a normal signal for packages of a predetermined weight and an overweight signal for packages of a greater weight, a member mounted to move back and forth across said conveyor thereby to shift a package laterally toward one end of the conveyor while leaving the package on the conveyor, and means responsive to said weighing mechanism and operable in response to an overweight signal to move said member laterally and shift the overweight package.

References Cited in the file of this patent

UNITED STATES PATENTS

| | | |
|---|---|---|
| 1,916,552 | Beach | July 4, 1933 |
| 1,923,009 | Miller et al. | Aug. 15, 1933 |
| 1,935,075 | Brubaker et al. | Nov. 14, 1933 |
| 2,688,458 | Schieser et al. | Sept. 7, 1954 |
| 2,736,431 | Coleman et al. | Feb. 28, 1956 |